(12) United States Patent
Flaminio et al.

(10) Patent No.: US 11,772,694 B2
(45) Date of Patent: Oct. 3, 2023

(54) METHOD AND SYSTEM FOR REMOTE CONTROL OF HUMAN MACHINE INTERFACES

(71) Applicant: HITACHI RAIL STS S.P.A., Naples (IT)

(72) Inventors: Luca Flaminio, Scafati (IT); Fausto Del Villano, Torre Annunziata (IT); Michele Bozzaotre, Castellammare di Stabia (IT); Claudio Vivarelli, Caserta (IT); Raffaele Pellecchia, Teverola (IT)

(73) Assignee: HITACHI RAIL STS S.P.A., Naples (IT)

( * ) Notice: Subject to any disclaimer, the term of this patent is extended or adjusted under 35 U.S.C. 154(b) by 346 days.

(21) Appl. No.: 16/636,166

(22) PCT Filed: Jul. 13, 2018

(86) PCT No.: PCT/IB2018/055183
§ 371 (c)(1),
(2) Date: Feb. 3, 2020

(87) PCT Pub. No.: WO2019/025890
PCT Pub. Date: Feb. 7, 2019

(65) Prior Publication Data
US 2020/0262458 A1 Aug. 20, 2020

(30) Foreign Application Priority Data
Aug. 3, 2017 (EP) .................................. 17184696

(51) Int. Cl.
*B61L 25/08* (2006.01)
*B61L 25/02* (2006.01)
*H04L 9/40* (2022.01)

(52) U.S. Cl.
CPC ............... *B61L 25/08* (2013.01); *B61L 25/02* (2013.01); *H04L 63/0435* (2013.01); *H04L 63/0442* (2013.01)

(58) Field of Classification Search
None
See application file for complete search history.

(56) References Cited

U.S. PATENT DOCUMENTS 9,262,649 B2 *  2/2016  Bertin ...................... G06F 21/87
10,157,241 B2 * 12/2018  Hoshina ................ G06F 16/904
(Continued)

FOREIGN PATENT DOCUMENTS

EP    2244188 A1 * 10/2010  .............. B61L 25/06
EP    2244188 A1    10/2010
(Continued)

OTHER PUBLICATIONS

International Search Report; priority document.

*Primary Examiner* — Adam D Tissot
(74) *Attorney, Agent, or Firm* — Greer, Burns & Crain, Ltd.

(57) ABSTRACT

The present invention relates to a method for remotely controlling the status of graphic user interfaces such as monitors, panels, displays, screens and others, used in railway or transportation systems. For achieving a reliable safety level, so that a person can be sure that the information displayed by the graphic interface in real time correspond to the effective situation of the transportation network, there is provided a feedback control loop between an image elaboration-generation block, and a safety block. According to a preferred solution, the communications between the blocks of the control loop are encrypted. With the control method of the present invention, it is possible to achieve a top safety level in the railway networks, even when using commer- (Continued)

cially available graphic user interfaces, such as COTS terminal.

14 Claims, 7 Drawing Sheets

(56) References Cited

U.S. PATENT DOCUMENTS

| | | |
|---|---|---|
| 2005/0276514 A1 | 12/2005 | Fisher |
| 2007/0013693 A1 | 1/2007 | Hendrick |
| 2009/0116380 A1 | 5/2009 | Santiago et al. |
| 2014/0351279 A1 | 11/2014 | Hoshina |

FOREIGN PATENT DOCUMENTS

| | | |
|---|---|---|
| EP | 2254039 A1 | 11/2010 |
| JP | 2009510488 A | 3/2008 |
| JP | 2010268021 A | 11/2010 |
| JP | 2011505613 A | 2/2011 |
| WO | 2013108381 A1 | 7/2013 |

* cited by examiner

METHOD AND SYSTEM FOR REMOTE CONTROL OF HUMAN MACHINE INTERFACES

CROSS REFERENCES TO RELATED APPLICATIONS

This application is a United States National Stage Application under 35 U.S.C. Section 371 of International Patent Application No. PCT/IB2018/055183 filed on Jul. 13, 2018, claiming priority to European Patent Application No. 17184696.7 filed on Aug. 3, 2017, which is hereby incorporated by reference as if fully set forth herein.

Under a broad and general aspect, the present invention relates to human machine interfaces, such as those used in the control and/or regulation of railways, apparatuses, devices, transportation systems and others.

Before continuing further in this description, it must be stated that although the present invention is particularly aimed at the remote control of computerized terminals, such as monitors, panels, displays, screens and others, used in railway transportation, the principles of the invention may apply also to other graphical interfaces used in industry.

Indeed, it is well known that in many technological or industrial fields the information about the working status of an apparatus or of a manufacturing process, are displayed on interface of computer operating environment, such as As it is known, supervision and control systems for safety-critical applications such as those used in the railways transportation networks, allow the human operators to interactively monitor the state of the system by means of graphical interfaces, that must be compliant with specific safety requirements.

The operators can use the information displayed on the screen to make decisions which have impact on the safety of people and things, namely passengers and trains in railroads applications.

The resultant effect is that the detection and the control of critical situations associated to the safety or fault diagnosis, are strictly dependent on the reliability of the images displayed on screens, panels, monitors or similar.

Video visualization systems for transportation railways generally located into key locations like stations, they consist of a computer network that displays vital system information, together with relative status and alarm lists.

Regard to railway industry, centralized control rooms are frequently organized for monitoring and supervising train traffic by displaying sensible data on computer screens, like current train routes, signal aspects and train positioning. For guaranteeing a reliable evaluation of the signalling system state, it is crucial to assure a full control of the image flow for instantly detected safety critical events and/or the occurrence of anomalous behaviors.

For instance, due to the subsequent visualization of still images, the absence of video frame refreshing could be a critical aspect in the decisional tasks, reducing the operational effectiveness of users work.

For safely displaying information it is generally required that all the part of the system which supply the images, are so arranged and controlled that the resultant architecture is conform to a certain Safety Integrity Level (SIL).

From an architectural point of view, the supervision and control systems are fundamentally Human Machine Interfaces (HMIs), including with this term all the elements that an user employs to carry out his tasks or decisions.

This implies that every system's component must be considered in the design to ensure that the resulting product will optimally support the operator to achieve the safety goals.

In detail, for making the design conform to a certain safety level according to the standards internationally acknowledged, such as the CENELEC EN (i.e. European technical norms issue by the European Committee for Electrotechnical Standardization), it is necessary to plan proper and extensive testing and control mechanisms for detecting potential error sources in the image processing chain.

This is not an easy task, because all parts of the design must be controlled, like CPU, graphic card, memories, and all other hardware elements, as well as graphic user interfaces, operating systems, driver software, and so on.

The control becomes more critical considering that the visualization systems are usually based on commercially available (i.e. off-the shelf) products, also referred to as COTS by persons skilled in the art, with the subsequent limits due to the fact that it is impossible to exhaustively know their internal details and hence define their failure modes.

Figure 1:
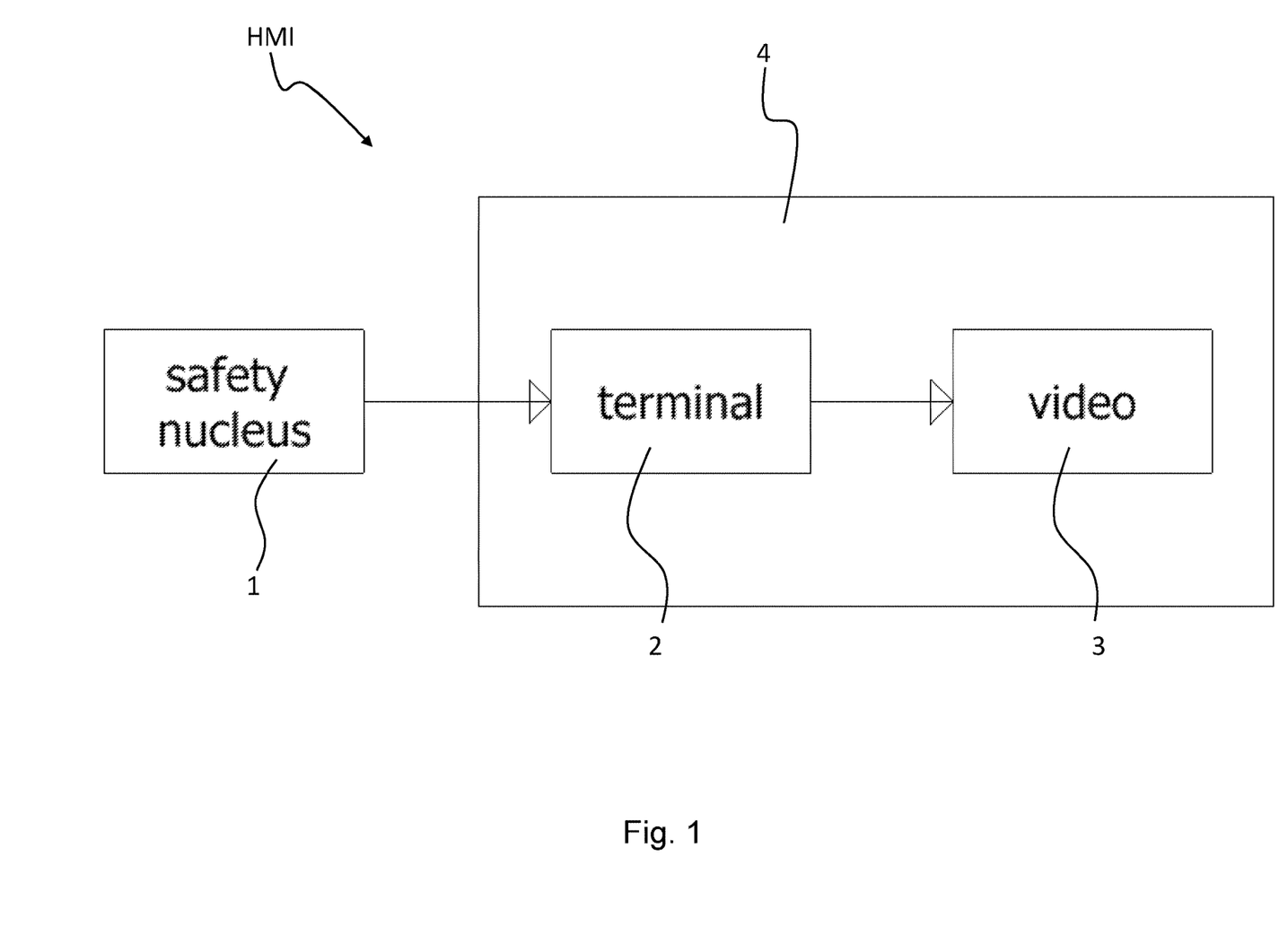
FIG. 1 is a block diagram representing a control system of the prior art.

FIG. 1 shows a diagramatic representation of a typical HMI according to the prior art, wherein a subsystem or unit for the symbols status generation (safety nucleus) is indicated with reference numeral 1; a unit or subsystem for the data elaboration and image generation (off-the-shelf or COTS terminals) is referred as 2, while a subsystem for the image visualization (off-the-shelf video cards and monitors) is block 3.

It is possible to assert that the process of the symbols status generation can be considered safely thanks to the development of safety-critical software according to CENELEC norms.

Nevertheless, all the operating steps planned by EN 50128 such as periodic testing, credibility checks, control flow monitoring, duplicated computation and comparison are able to increase the reliability of the visualization system, but are not sufficient per se because the vital image is forced to cross a safety critical path through different off-the-shelf components, as visible in FIG. 1.

The limit of the presently known HMI using off-the shelf or COTS terminals, is how to prevent such terminals to show incorrect information after a fault.

More specifically, the image generated by the elaboration unit could be still displayed on monitors, screens, panels, video supports, or the like, also in presence of a recognized fault. Any disfunctional behavior of COTS components will impact on the visualization accuracy.

At the present, the use of certified monitors excludes possible problems related to their reliability; nevertheless, off-the-shelf operating systems, graphic libraries and video cards are employed in the current solutions, so that their control remains a crucial aspect.

There are known different techniques applied to HMI-based systems for providing a safe operator interface, with the benefit of assuring reliable decisional and monitoring actions. In the most of cases, the management of the video data flow is reached through test procedures to monitor safety critical processes. They are based on the recognition of errors that could impact to the final resultant image, such as errors in visualization software task, in graphics control or faults in graphics memory.

Innovative approaches can be found in literature aided to obtain these aims. About the detection of possible data corruption during video data transfer, a solution is provided for example in European patent application EP 2 244 188, where a part of the bitmap data is systematically transformed according to a known algorithm. In this way, the image generation unit has the possibility to verify the effective data coherence through a related conversion mechanism. In visualization based system, this technique reveals useful for assuring a correct transfer of bitmap data from a principal memory (like CPU) to a secondary one (like a video memory).

Since potential errors could remain undiscovered, further and complementary mechanisms must be provided to properly test and manage the remaining safety critical units. However, if the extensive adoption of similar techniques makes sure a full management of the whole system, on the other side, especially for real time applications, it could result very time intensive and cost one. Nowadays, this hurdle has been cleared by the introduction into traditional systems of dedicated modules able to efficiently process video data and contextually to verify its integrity through internal procedures.

An example of this state of the art is disclosed by international (PCT) patent application WO 2011/003872, where the data coherence of the current image is checked through a comparison made by a FPGA-based safe test unit, expressly inserted between the computer generating the image data and a thin film transistor (TFT) display or panel.

In this prior art, the use of programmable logic makes possible a more time efficient image processing, although the common test approach (based on a partial elaboration of the image with consequent check of the resultant data) is preserved. Specifically, in the case of WO 2011/003872, the incoming image is portioned in more sections, with the distinction between safety and non-safety related information.

With respect to each safety critical image segment, the FPGA has the primary roles to generate an associated fingerprint (like a cyclic redundancy check or CRC) and to search a correspondence with existing reference codes, previously saved in the form of tables. Memory based charts are then used to associate the selected code with an image belonging to a discrete set, representative of its possible states.

In this way, the validity of the input image portion is established by a comparison with respect to the expected input parameter and, in the case of a negative result, consequent safe reactions can be promptly activated.

The test procedure disclosed in WO 2011/003872 is particularly suitable only for applications where the plausible image set is limited (applications like tachometers), avoiding in such a manner excessive consumption of computing resources.

Therefore, in the railway control field, the abovementioned approach results not feasible for typical visualization systems where the whole or most of the generated image consists of safety related information.

In this case, it is not possible to separate the image in smaller subareas, with consequent challenge to have both to process and to control a wide image, normally characterized by a high resolution. In practical situations, it happens that the generated image need to be displayed on multiple monitors (up to eight), with resolution of each one up to 1920×1200 pixels.

On the other side, the information carried by a typical image depends on the specific application: therefore, because of the complexity and the variability of the displayed data, it is not reasonable to prearrange ad hoc fingerprint based tables, according to WO 2011/003872.

This could involve an inefficient overload of the system for considering every plausible state, with the additional disadvantage to require excessive memory utilization.

The inadequacy of the aforementioned test methods or equivalent approaches brings to the need for adopting new system architectures, suitable to ensure the appropriate safety level and the specific performance characteristics required by railway applications.

In view of the foregoing it can be stated that the technical problem underlying the present invention, is that of providing a control system for human machine interfaces (HMI), graphical user interfaces (GUI) or the like, having such functional and/or operating features as to overcome the drawbacks of the known control systems of the prior art.

Within this general problem, it is also an object of the present invention to provide a control system for human machine interfaces (HMI), which allows to use COTS components such as terminals, screens, displays or others, and to comply with the safety or technical regulations.

The idea for solving the technical problem is that of providing a process, that can be preferably implemented by an algorithm, suitable to counteract the lack of control on the COTS components or terminals.

For this purpose, the process comprises a step of controlling COTS components by means of a feedback loop: this approach provides for a more reliable visualization of the images.

The proposed solution allows to overcome the limits of the prior art, while still using off-the-shelf components and increasing at the same time the safety of the overall visualization system.

Using COTS terminals and components, i.e. commercially available products, the overall costs of the systems implementing the method of the invention have also reduced costs without impairing their reliability.

The features of the invention are specifically set forth in the appended claims.

Such features will become more apparent from the following description of a preferred but non limiting embodiment of the invention, which will be described herein after with reference to the appended drawing wherein:

Figure 2:
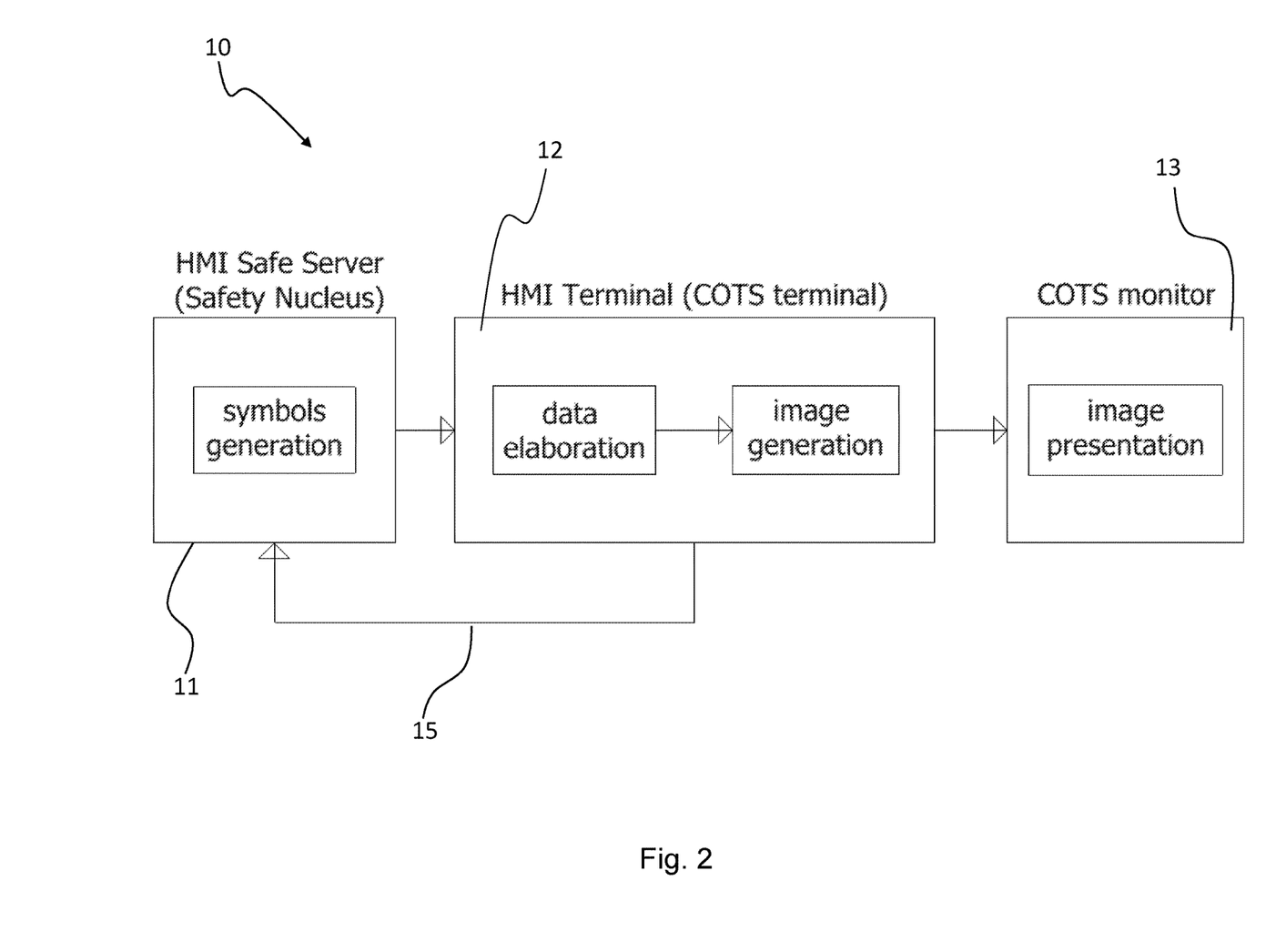
FIG. 2 is a block diagram representing a control system according to the present invention.

With reference to the drawings listed above and in particular to FIG. 2, that shows a block diagram of an HMI of the invention generally referred to with numeral 10, for sake of simplicity there are identified three main operating units or blocks: an HMI safe server block 11, an HMI terminal block 12, and a COTS monitor block 13.

These blocks or units 11, 12 and 13 are serially connected to each other as shown by arrows in the drawings and, according to a preferred embodiment, the HMI system 10 comprises a feedback control loop 15, between the HMI terminal 12 and the HMI safe server 11.

Overall, the process of generating and displaying the image to the video on COTS monitors 13, is divided into a series of steps involving the two subsystems HMI Safe Server 11 and HMI Terminal 12.

More specifically, HMI Safe Server 11 carries out the following steps:

generating the status of the symbols to be displayed;
sending an encrypted copy of the state to the HMI Terminal 12;
providing, in the normal operational mode, to the HMI Terminal 12 the cryptographic keys for decoding the state;
supervising the outcome of the diagnostic tests performed on each HMI Terminal 12 and assigning them the normal or safe operational mode.

Meanwhile, the HMI terminal 12 carries out the following steps:
decrypting the status of the symbols received by HMI Safe Server with the received key;
generating the image to be displayed;
running diagnostics routines required by the HMI Safe Server 11;
sending the reply message to the HMI Safe Server 11.

Figure 3:
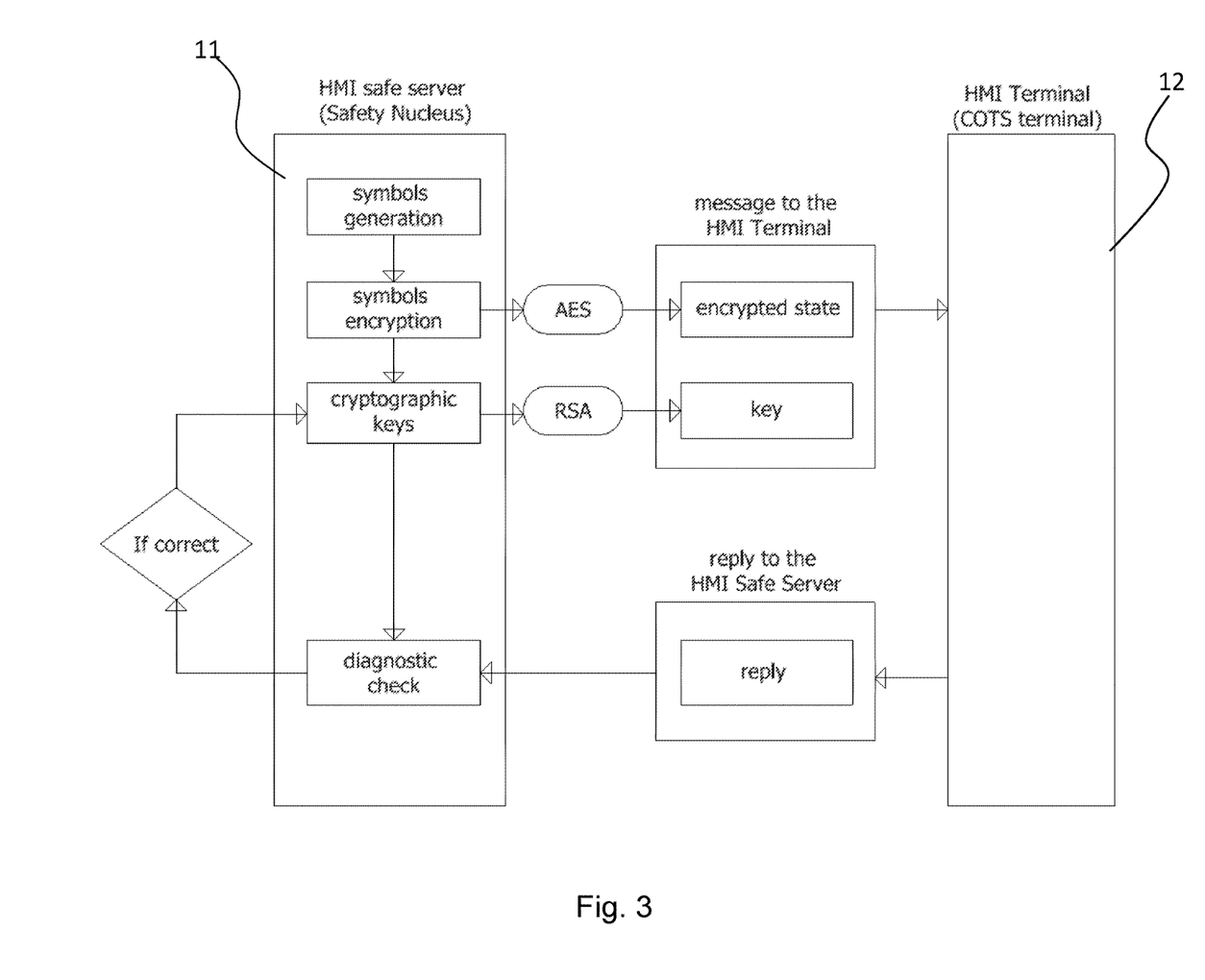
FIGS. 3, 4 and 5 are flow charts showing respective operating phases of the control method of the present invention.
Figure 4:
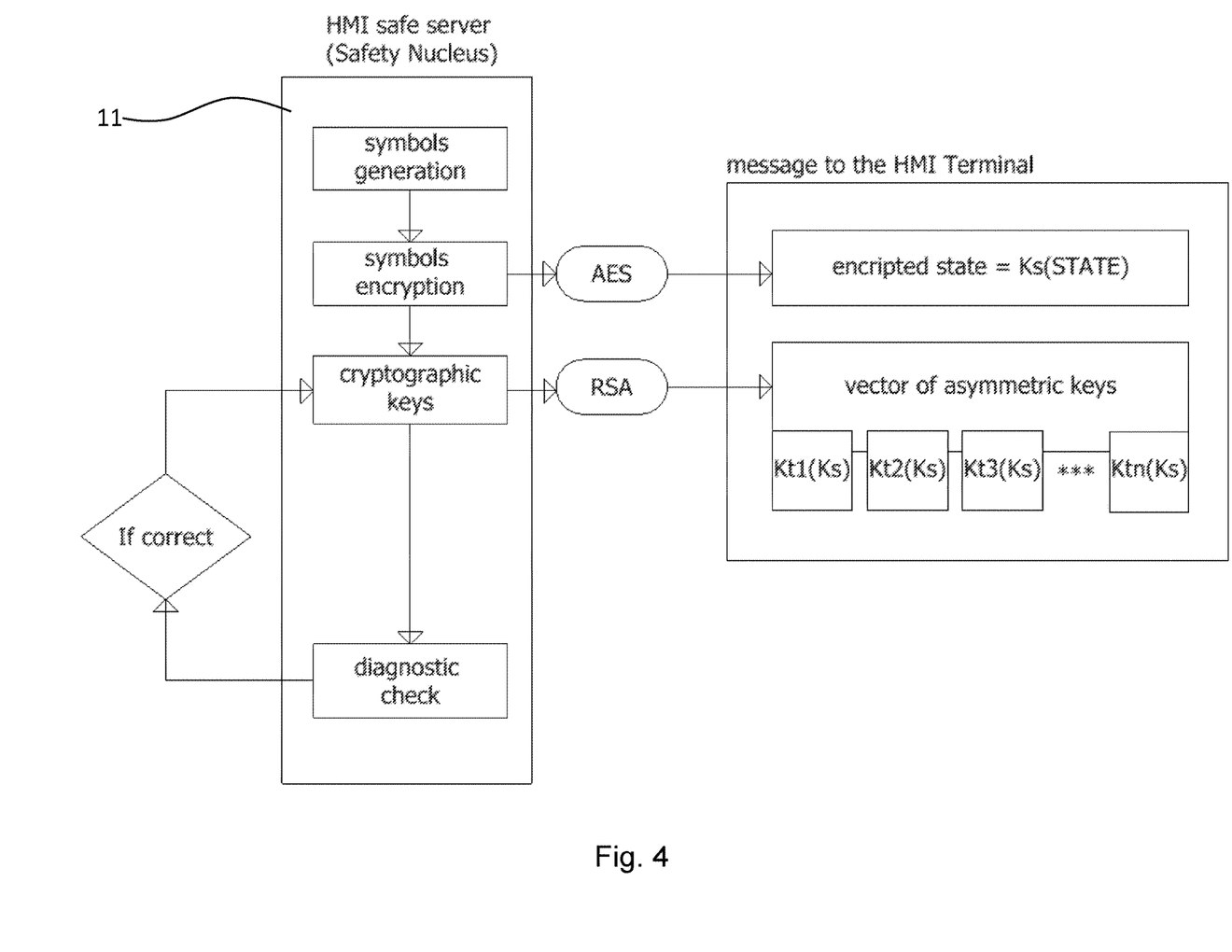
Figure 5:
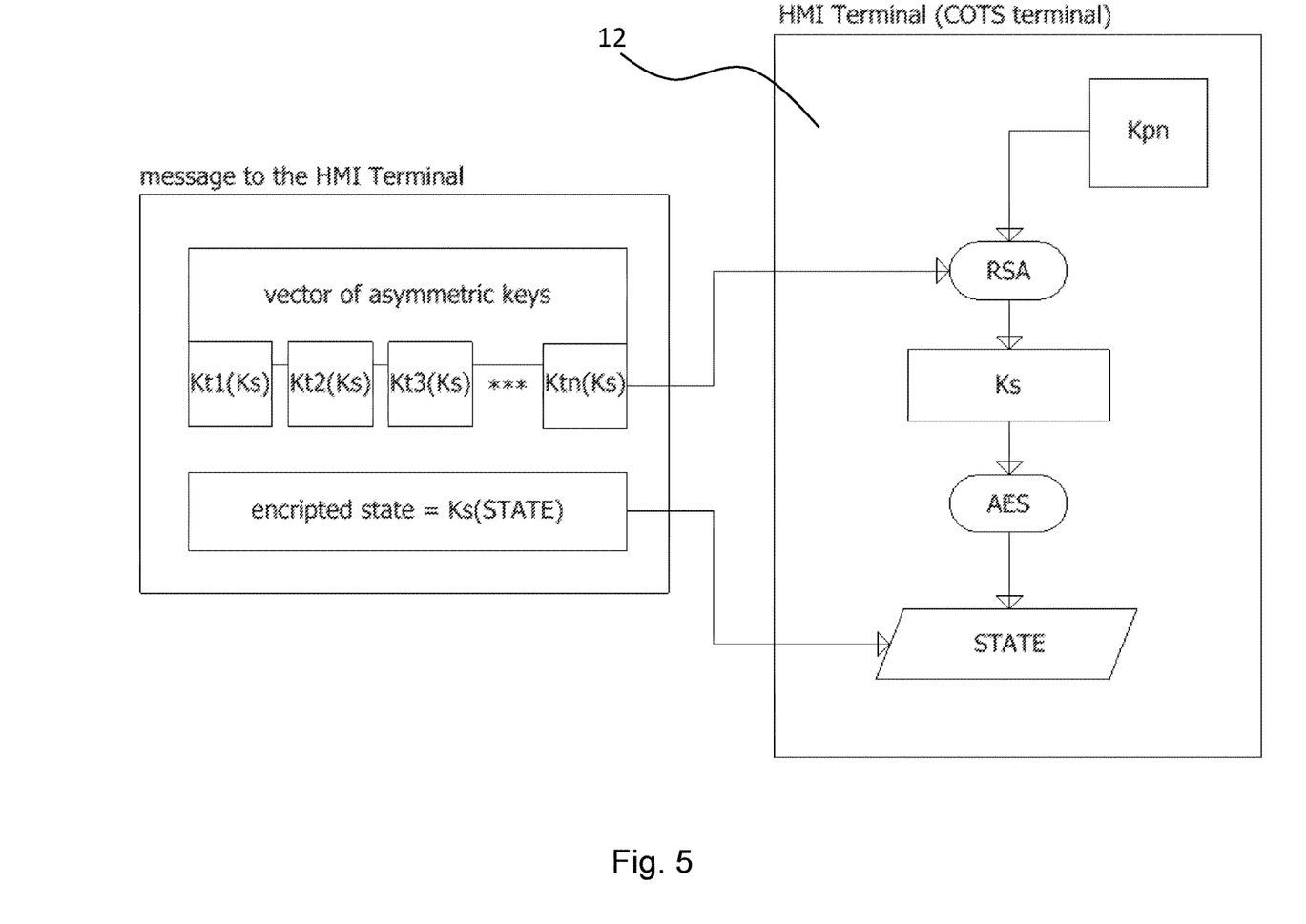

As can be seen from the flow charts of FIGS. 3-5, a new and original feature of the present invention is that through the use of cryptographic techniques, it allows the HMI safe server 11 to enable/disable safely the updating of the display on the individual HMI terminal 12.

ensure, within the desired rate of probability, the identification of possible HMI Terminal 12 malfunctions.

The second condition or constraints is that in the absence of a non-updated state, the HMI Terminal 12 must not be able to produce a valid image for the operators COTS monitors 13.

Figure 6:
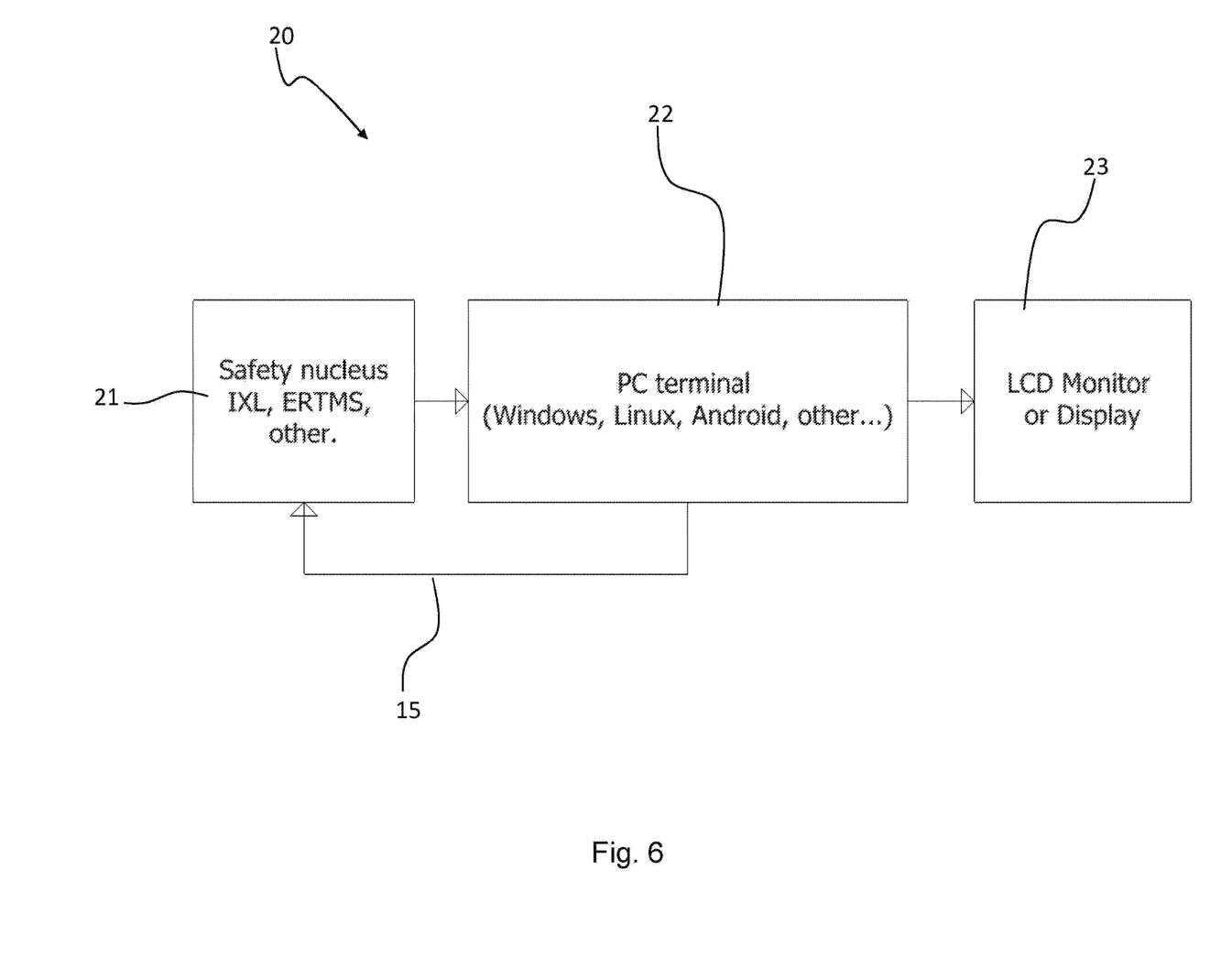
FIGS. 6 and 7 are further block diagrams showing the operation of the control system of the present invention.

Since in both cases it comes to application constraints which solution to apply, the application of the present invention to railways control systems is better explained with reference to FIGS. 6 and 7.

In the context of railway signaling applications, with particular reference to operator interfaces, a HMI control system 10 comprises a Safety Nucleus 11 acts like HMI Safe Server 11 of the diagram in FIG. 2, while COTS PC 12 acts like previous HMI Terminal 12.

In the system COTS LCD Monitors 13 are used, and having regard to these definitions, the table reported below shows in horizontal lines the parameters (threats) that must be addressed to ensure the accuracy of the display 13, whereas in the vertical columns there are reported the possible counteractions.

|  | SW and data diversity | Forced Video Refresh | Runtime Video Memory Testing | Oflline/Runtime test of Graphic Library | Control flow check | State Checksum | Vitality |
|---|---|---|---|---|---|---|---|
| Video Memory fault |  | X | X |  |  |  | X |
| RAM fault | X |  |  | X | X | X |  |
| Generic COTS software fault | X |  |  | X | X | X |  |
| Generic COTS hardware fault | X | X | X |  | X |  |  |
| Communication fault |  |  |  |  | X |  |  |

In particular, according to a preferred embodiment, the communication between the HMI Safe Server 11 and HMI Terminals 12 uses two levels of encryption:
1. symmetric key encryption with AES to protect the symbols state sent by the HMI Safe Server 11 through all the HMI Terminals 12. The HMI Safe Server 11 uses a key "Ks" that is changed at each processing cycle;
2. asymmetric key encryption with RSA to protect the cryptographic key "Ks". The HMI Safe Server 11 sends the "Ks" key (necessary to decrypt the state) in a further encrypted message. There is a pair of unique keys for each HMI Terminal 12; each HMI Terminal 12 can get the key "Ks" only decoding the proper key block.

In the drawings, Ks is the symmetric key used to encrypt the status block (FIG. 4—point 1); Ktn is the public asymmetric key used to encrypt Ks towards the HMI Terminal n (FIG. 4—point 2); Kpn is the private asymmetric key used by the HMI Terminal n to operate decryption Ktn(Ks) (FIG. 5—point 1).

Upon providing the right key for decryption of the symbols state, and after having checked the required diagnostic outcomes, the HMI Safe Server 11 enables the HMI Terminals 12 to generate the output image to be sent to the COTS monitors 13.

In the absence of such authorization, the HMI Terminal 12 cannot build the correct state to produce a valid image.

This provides for two constraints or conditions for the applications that use the proposed system.

Figure 7:
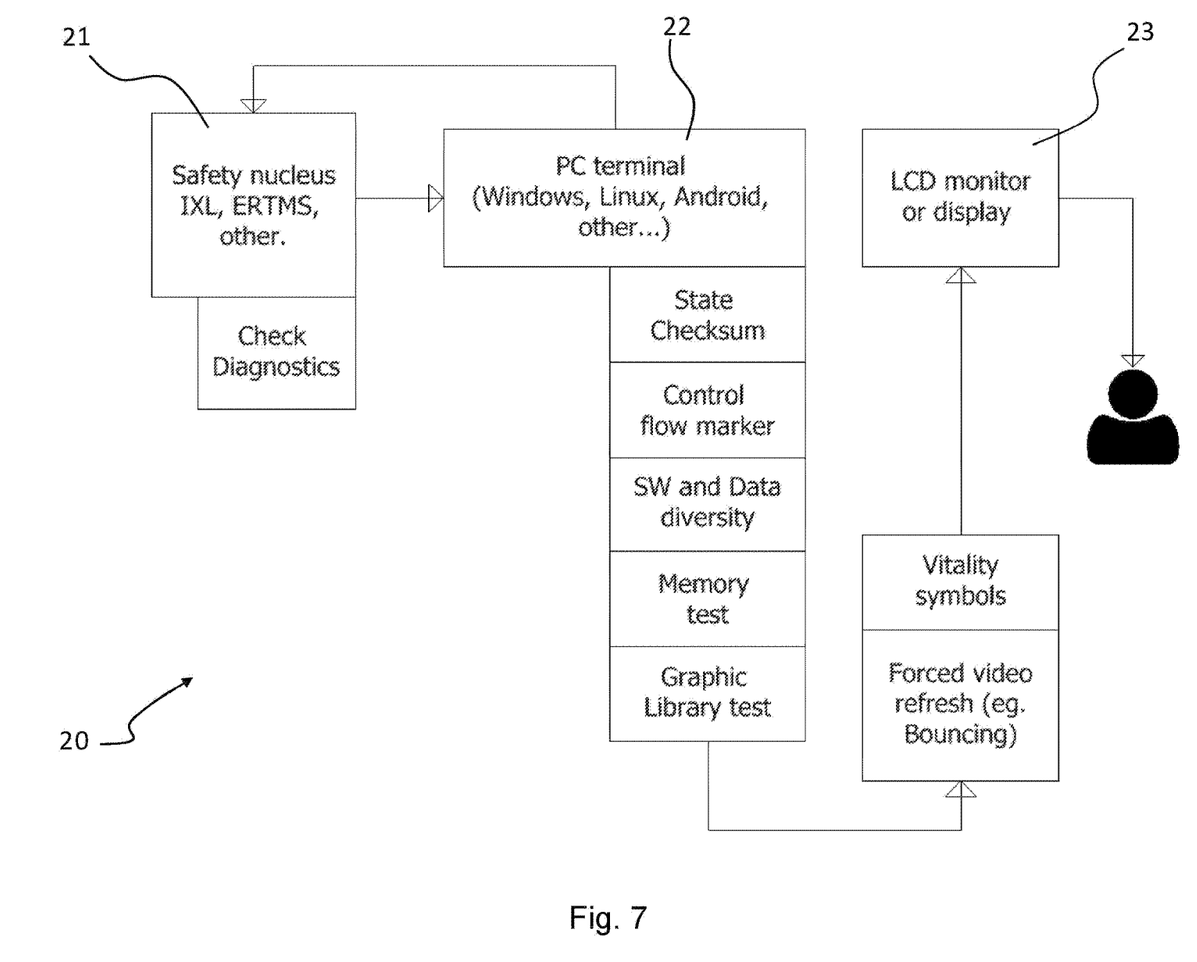

The first condition is that the diagnostic outcomes processed by the HMI Safe Server 11, must be designed to Each feature of the table can be allocated as in the flow diagram of FIG. 7.

Using the set of features disclosed herein, the feedback control loop provides for safely enabling or disabling the COTS terminals 12, thereby ensuring that an operator looking at the monitor 13 can rely on the full correctness of the images displayed therein.

In other words, in the HMI control system 10 according to the invention, only images whose reliability has been fully tested by the feedback control loop 25, are sent to the final monitor and/or screen, panel or other visual display 13.

From the foregoing explanations it can therefore be appreciated how the present invention solves the technical problem set forth initially.

Indeed, the proposed solution improves the overall safety of a visualization system by adding a closed loop for controlling the critical path of COTS components.

The feedback chain makes independent the reliability of the visualization process from the particular set of used COTS products.

More precisely, considering only as necessary system specification the safe generation of the image corresponding to the status of signalling symbols, there is no other vital mechanism to introduce for reaching the safety goal. Every significant error caused by a malfunctioning hardware or software source, in fact, will be reported into the feedback loop and this will lead to a safe stop of the image updating.

The proposed method is easy to integrate and customize into existing architectures with no economic (i.e. costs)

impact, so that in the railway field it is possible to discard the current monitoring systems based on proprietary hardware.

Besides, thanks to its independence from the specific application, the system can be applied wherever a safe graphical visualization interface (HMI, GUI or others) is required.

Therefore, it is possible to extend its employment to other operating contexts or to other companies as well, bringing to improve the safety of people and things, with a significant social impact.

The invention claimed is:

1. A method for remote control of human machine interfaces (HMI) used for the supervision and/or regulation of portions of railway transportation systems, comprising the steps of:
    acquiring data about a status of the system to be supervised, and generating at least one of a graphic symbol or information,
    processing the at least one of the graphic symbol or information and generating an image corresponding to the at least one of the graphic symbol or information,
    visualizing the image on displaying means, and
    comparing the at least one of the graphic symbol or information and the image to be visualized, for checking whether the at least one of the graphic symbol or information and the image to be visualized correspond to each other so that only images generated by data positively checked, are visualized by the displaying means,
    wherein the at least one of the graphic symbol or information is encrypted and the processing step includes the decryption of the at least one of the at least one of the graphic symbol or information, for comparing the decrypted the at least one of the graphic symbol or information with previously acquired data, before the visualization step,
    and wherein a human machine interface (HMI) encrypts the at least one of the graphic symbol or information, and
    wherein a displaying means decrypts the at least one of the graphic symbol or information.

2. The method according to claim 1, wherein a two level encryption is used.

3. The method according to claim 2, wherein the at least one of the graphic symbol or information acquired about the status of the system comprise symbols.

4. The method according to claim 3, wherein the processing step and/or the visualization step are carried out respectively by means of an off-the-shelf terminal and/or an off-the-shelf display.

5. The method according to claim 4, wherein the transportation system is a railroad or tramway line.

6. Method according to claim 1, comprising the steps of:
    generating a status of the image to be displayed;
    sending an encrypted copy of the status to the human machine interface terminal;
    providing, in a normal operational mode, to the human machine interface terminal one or more cryptographic keys for decoding the status;
    supervising an outcome of one or more diagnostic tests performed on the human machine interface terminal and assigning each outcome to an operational mode.

7. The method according to claim 1, comprising the steps of:
    decrypting the status of the image received by an HMI Safe Server with a received key;
    generating the image to be displayed;
    running diagnostics routines required by the HMI Safe Server;
    sending a reply message to the HMI Safe Server.

8. A human machine interface for carrying out the method of claim 1, comprising:
    a safety unit for acquiring data about the status of the system to be supervised, and for providing at least one of a graphic symbol or information corresponding thereto;
    a human machine interface terminal communicating with the safety unit for processing the at least one of the graphic symbol or information provided by the safety unit and a generation of an image;
    a visualization unit communicating with the human machine interface terminal for displaying images, wherein the human machine interface terminal provides for:
        processing the at least one of the graphic symbol or information and generating an image corresponding to the at least one of the graphic symbol or information,
        visualizing the image on displaying means,
        comparing the at least one of the graphic symbol or information and the image to be visualized, for checking whether the at least one of the graphic symbol or information and the image correspond to each other so that only images generated by data positively checked, are visualized by the displaying means,
    wherein the safety unit encrypts the at least one of the graphic symbol or information provided by the safety unit, whereas the human machine interface terminal decrypts the at least one of the graphic symbol or information provided by the safety unit.

9. The human machine interface according to claim 8, wherein the human machine interface terminal operates decryption of the at least one of the graphic symbol or information and compares them with the at least one of the graphic symbol or information provided by the safety unit.

10. The human machine interface according to claim 9, wherein the safety unit supervises the comparison made by the human machine interface terminal.

11. A human machine interface according to claim 8, wherein the human machine interface terminal and the visualization means comprise elements of off-the-shelf type.

12. The method according to claim 1, wherein a use of cryptographic techniques, it allows a human machine interface safe server to safely enable and disable an updating of a display on an individual human machine interface terminal.

13. The method according to claim 12, wherein a two level encryption is used.

14. A method for remote control of human machine interfaces (HMI) used for the supervision and/or regulation of portions of a railway transportation systems, comprising the steps of:
    acquiring data about a status of the system to be supervised, and generating at least one of a graphic symbol or information,
    processing the at least one of the graphic symbol or information and generating an image corresponding to the at least one of the graphic symbol or information,
    visualizing the image on displaying means, and
    comparing the at least one of the graphic symbol or information and the image to be visualized, for checking whether the at least one of the graphic symbol or information and the image to be visualized correspond to each other so that only images generated by data positively checked, are visualized by the displaying means, decrypting the status of the image received by an HMI Safe Server with a received key;

generating the image to be displayed;

running diagnostics routines required by the HMI Safe Server;

sending a reply message to the HMI Safe Server;

wherein a feedback control loop between a human machine interface terminal and the HMI Safe Server provides for safely enabling or disabling display, thereby ensuring that an operator looking at the monitor can rely on the correctness of the images displayed therein, wherein only images whose reliability has been tested by the feedback control loop are displayed.

\* \* \* \* \*